(12) United States Patent
Blount

(10) Patent No.: US 8,268,121 B2
(45) Date of Patent: Sep. 18, 2012

(54) DELIGNIFICATION OF BIOMASS CONTAINING LIGNIN AND PRODUCTION OF AMINO LIGNIN ALDEHYDE RESINS AND CARBOHYDRATES

(76) Inventor: David H. Blount, San Diego, CA (US)

( * ) Notice: Subject to any disclaimer, the term of this patent is extended or adjusted under 35 U.S.C. 154(b) by 406 days.

(21) Appl. No.: 12/589,399

(22) Filed: Oct. 23, 2009

(65) Prior Publication Data

US 2011/0094678 A1     Apr. 28, 2011

(51) Int. Cl.
*D21C 3/20* (2006.01)
*C08H 7/00* (2011.01)
(52) U.S. Cl. ........... 162/72; 156/336; 527/400; 530/501
(58) Field of Classification Search .................... 162/72; 156/336; 527/400; 530/501
See application file for complete search history.

(56) References Cited

U.S. PATENT DOCUMENTS

| | | | | |
|---|---|---|---|---|
| 2,037,001 A * | 4/1936 | Aronovsky | ...................... | 162/14 |
| 3,097,177 A * | 7/1963 | Waldo | ............................ | 524/499 |
| 7,029,553 B1 * | 4/2006 | Williams et al. | ................ | 162/29 |

FOREIGN PATENT DOCUMENTS

GB       2086955 A  *  5/1982

OTHER PUBLICATIONS

Li et al., Characterization of extracted lignin of Bamboo pretreated with sodium hydroxide/urea solution at low temperature, 2010, BioResources, 5(3), 1762-1778.*
Bajpai et al., Use of Urea as an Additive in Kraft Pulping of Eucalyptus, Aug. 2008, TAPPI Engineering, Pulping and Environmental Conference, p. 1-8.*

* cited by examiner

*Primary Examiner* — Anthony Calandra

(57) ABSTRACT

Delignification of biomass consisting of lignin containing plant is done by utilizing an amino compound in and aqueous solution at ambient temperature up to 150 degree C. to produce and aqueous solution of amino salt of lignin and an amino-lignin-cellulose which is not soluble in water. The aqueous solution of amino salt of lignin is then filtered off of the amino-lignin-cellulose. The aqueous solution of amino salt of lignin or the amino salt of lignin with the amino-lignin-cellulose may be reacted with an aldehyde to produce an amino-lignin-aldehyde resin or an amino-lignin-cellulose aldehyde resin which may be of the thermoplastic or thermosetting type. The thermoplastic resins are fire resistant, hard, strong, not water soluble and may be used to make exterior fiberboard, OAS boards, plywood, molded products, etc. These urea salts of lignin may also be utilized as long acting fertilizer, to produce plastics and other products.

The amino-lignin-cellulose may be hydrolyzed by any suitable means such as acid hydrolysis into carbohydrates which can be fermented in alcohol.

19 Claims, No Drawings

DELIGNIFICATION OF BIOMASS CONTAINING LIGNIN AND PRODUCTION OF AMINO LIGNIN ALDEHYDE RESINS AND CARBOHYDRATES

FIELD

The invention concerns urea and other amino compounds utilized in an aqueous solution to break the lignin cellulose bond and react the amino compound with the lignin and with the lignin attached to the cellulose to produce amino salt of lignin and amino-lignin-cellulose. An amino compound is mixed with a lignin containing plants in water at ambient temperature or heated. The aqueous solution containing preferred amino compound that will break the lignin cellulose bond, such as urea and guanidine compounds, and lignin containing plant is placed in amino water solution for 12-24 hours or is heated at 50 to 150 degree C. for 1-4 hours at ambient pressure or elevated pressure. The lignin reacts with the delignification amino compounds to form amino salt of lignin which is soluble in water and the amino compounds reacts with lignin that is still attached to the cellulose to produce amino-lignin-cellulose. The water containing the amino salt of lignin is filtered from the amino-lignin-cellulose. The aqueous solution of the amino salt of lignin is treated to remove most of the water to form a thick solution. The aqueous solution of amino salt of lignin is then reacted with an aldehyde such as formaldehyde by heating the solution thereby producing a thermosetting amino lignin formaldehyde resin. The reaction of amino salt of lignin with an aldehyde may be modified by use of a basic or acidic catalyst. In a basic solution a thermoplastic amino salt of lignin aldehyde resin is produced and in an acetic solution a thermosetting amino salt of lignin aldehyde resin is produced. The amino salt of lignin aldehyde resin is utilized as an adhesive to produce composites and molded product. The amino-lignin-cellulose and amino salt of lignin and formaldehyde are reacted to form an amino-lignin-cellulose-formaldehyde resin or the amino-lignin-cellulose is hydrolyzed with concentrated acid to carbohydrates.

BACKGROUND

The use of urea aldehyde resins containing lignin sulfonate is well know in the Art but the use of amino compounds such as urea, guanidine, cyanoguanidine, aminoguanidine, guanidine carbonates and mixtures thereof for delignification of lignin from biomass consisting of lignin containing plants and at the same time reacting the amino compound with lignin and with lignin still attached to the cellulose is novel before reacting the amino compound with an aldehyde. There are many US and Foreign Patents which utilized urea formaldehyde resin containing lignin sulfonate and other extracted lignin but no articles or patents were found that produces amino salt of lignin in the process of delignification of plants containing lignin. U.S. Pat. No. 2,366,265 of Reiche et al. and U.S. Pat. No. 2,622,979 of Keim extends the urea formaldehyde resin by the addition of lignin-sulfonate. U.S. Pat. No. 3,994,860 of Willegger and Thiel adds the lignin sulfonate to the formaldehyde and urea to produce a resin. The use of aminoplasts as an adhesive and resin is well known in the art but an aqueous solution of the aminoplasts such as urea formaldehyde resin does not have any properties to break the lignin cellulose bond. Unlike the prior art processes of these representative patents, in accordance with this invention most of the lignin and cellulose bonds are broken by the amino compound and the amino reacts with the lignin to produce an amino salt of lignin and amino-lignin-cellulose which are then reacted with an aldehyde to produce a amino salt of lignin cellulose aldehyde resin.

SUMMARY

In one aspect, the invention comprises the delignification of biomass consisting of lignin containing plants by an amino compound such as urea and/or guanidine compounds in an aqueous solution thereby producing amino salt of lignin and amino-lignin-cellulose.

Another aspect of the invention is a method to react the amino compound with the lignin to form an aqueous amino salt of lignin solution which is then filtered from the amino-lignin-cellulose.

Another aspect of the invention is a process to react the amino salt of lignin with an aldehyde to produce a resin comprising serially contacting:
(A) amino compound, preferable urea
(B) biomass consisting of lignin containing plant
(C) water
under conditions sufficient to break the lignin cellulose bond and react the lignin with amino compound to produce water soluble amino salt of lignin, and non-water soluble amino-lignin-cellulose.

Another aspect of the invention is a method to produce an amino salt of lignin aldehyde resin by reacting the urea salt of lignin with and aldehyde.

Another aspect of the invention is to not separate the amino-lignin-cellulose, and amino salt of lignin and react the urea salt of lignin and the urea-lignin-cellulose with an aldehyde to produce a rigid, hard, water resistant, fire resistant, thermosetting panel or other products.

Another aspect of the invention is to add the amino salt of lignin aldehyde to cellulose containing products and compress and cure the resin by heat.

Another aspect of the invention is to hydrolyze the amino-lignin-cellulose with concentrated acids such as sulfuric acid and hydrochloric acid to produce carbohydrates.

Component A

Amino Compounds such urea, guanidine, aminoguanidine, guanidine carbonate, cyanoguanidine and mixtures thereof are utilized to break the lignin cellulose bond and amino compounds are react with the lignin and with the lignin attach to the cellulose but has free acid radicals. The amino compounds may be in the form of a powder, crystals or a solid. Any suitable amino compound may be utilized with the urea and/or guanidine compounds to reach with the lignin such as melamine, dicyandiamide, melamine cyanurate, thiourea, methyl urea, biuret, cyanuric acid, urea condensates such as urea guanidine condensates, urea polyamine condensates, cyamelide, urea-melamine condensates, urea-cyandiamide, urea-aminoguanidine condensate, urea cyanoguanidine condensate, urea cyanurate, aminophosphates with free —$NH_2$ radicals and mixtures thereof. Urea is the preferred amino compound. The amino compounds are utilized in the amount of 25-100 parts by weight.

Component B

Any suitable biomass consisting of lignin containing plant may be used in this invention. Any suitable biomass consisting of lignin-cellulose or cellulose-containing plants or the products of cellulose containing plants which contain lignin and cellulose may be used in this invention. Many different biomass feed stocks can be used to produce fertilizer, resins, plastics or liquid fuel. Some of the common ones are agricultural crops, bio-energy crops, such as fast growing trees, agricultural residues, wood residues and waste streams from municipal solid waste cellulose fiber fines, bagasse and waste paper. The plant material is preferred to be in the form of small particles such as sawdust, wood chips or ground up biomass. In nature, lignin-cellulose and cellulose are widely distributed. It is found in all plants and they may be used in this process. Suitable cellulose-containing plants include, but are not limited to, trees, e.g., spruce, pine, hemlock, fir, oak, cypress, redwood, cherry, elm chestnut, hickory, locust, sycamore, tulip, tulip, butternut, apple, alder, magnolia, dogwood, catalpa, boxwood. Crabwood, mahogany, greenheart, lancewood, letterwood, mora, prima vera, purple-heart, rosewood, teak, satinwood, mangrove, waffle, orange, lemon, logwood, fustic, osage orange, sappanwood, Brazilwood, barwood, camwood, sandalwood, rubber, gutta, mesquite and shrubs, e.g., oleander, cypress, junipers, acanthus, pyracantha, ligustrum, lantana, bougainvillea, azalea, feijoa, ilex, fuscia, hibiscus, datura, holly, hydrangea, jasmine, eucalyptus, cottoneaster, xylosma, rhododendron, castor gean, eugenia, euonymus, fatshedera, aralia, etc., and agricultural plants e.g., cotton stalks, corn stalks, wheat straw, oat straw, rice straw, cane sugar (bagasse) soybean stalks, peanut plants, pea vines, sugar beat waste, sorghum stalks, tobacco stalks, maize stalks, barley straw, buckwheat straw, quinoa stalks, cassava, potato plants, legume vines and stalks, vegetable inedible portion, etc., weeds grasses, vines, kelp, flowers and mixtures thereof. The waste products of agricultural plants which contain cellulose and lignin may be ground into small particles and used in this invention. Commercial waste products containing lignin and cellulose, e.g., paper, baggasse wallboard, wood products, etc., may be used in this invention. Cellulose-lignin containing plants which have been partially decomposed, such as grass clippings, humus, peat and certain soft brown coal, may be used in this invention.

Other products of cellulose lignin containing plants may be recovered in the process of this invention such as waxes, gums, oils, sugars, wood alcohol agar, rosin, turpentine, resins, rubber latex, dyes, glycerol, etc. Lignin containing plants are utilized in the amount of 200 to 400 parts by weight.

Component C

Water is utilized to make and aqueous solution of the amino compounds and also to wash out the water soluble components such as amino salt of lignin from the amino-lignin-cellulose in the amount of 1-500 parts by weight.

Component D

Any suitable aldehyde may be utilized in this invention that will react with the amino salt of lignin or the amino-lignin-cellulose. Suitable aldehyde include but not limited to, formaldehyde, paraformaldehyde, acetoaldehyde, butyaldehyde, chloral, acrolin aldehyde and other aromatic aldehydes, furfural, benzyl aldehyde and mixtures thereof. Aqueous formaldehyde is the preferred aldehyde. The aldehyde is used in the ratio of 1 mol of amino compound to 1 to 3 moles of aldehyde.

Component E

Acetic or basic catalyst may be added to modify the reaction of the amino salt of lignin and/or amino-lignin-cellulose with the aldehyde to produce thermoplastic or thermosetting resin. Suitable basic compounds include but not limited to, compounds containing alkali metal, alkaline earth metal and ammonia radicals, amines and mixtures thereof. Suitable acidic compounds include, but not limited to, sulfuric acid, hydrogen chloride, nitric acid, halogen acids, acidic compounds containing sulfur, sulphonic acid halides, acidic phosphorus containing compound, carboxylic acids, polycarboxylic acids, citric acids and mixtures thereof. In some reactions basic or acidic catalytic are not necessary. Sulfuric acid and hydrogen chloride may be utilized to convert cellulose into carbohydrates. A catalytic amount is utilized may range from the amount of 0.1 to 100 parts by weight.

Component F

Any suitable filler may be added to the amino salt of lignin aldehyde resin or amino-lignin-cellulose resin. They may be inorganic substance, such as, alkali metal silicates, alkaline earth metal silicates, metal silicates, silica, metals and metal oxides, carbohydrates, sulphates, phosphates and borates, glass beads, and mixtures thereof. They may be organic substances such as, amino compounds, wood particles, cellulose, lignin, urea formaldehyde resin, amino salts of organic phosphates, phenol aldehyde resins, amino aldehyde resins, plastics, powdered coke, graphite, graphite compounds, plant particles and mixtures thereof. The filler may be used in the amount of 1 to 300 parts by weight.

Component G

Any suitable method may be used to convert the amino-lignin-cellulose and remaining cellulose into carbohydrates such as the dilute and/or the concentrated acid hydrolysis methods using sulfuric acid or hydrochloric acid. The concentrated acid utilized in the amount of 2 to 3 parts by weight of acid to 2 parts by weight of amino-lignin-cellulose

ILLUSTRATIVE EMBODIMENTS

In general, the lignin cellulose bond is broken by soak in an aqueous solution of the listed amino compounds at ambient temperature for 12 to 24 hours or by heating the biomass containing lignin cellulose plant particles in an aqueous solution of listed amino compounds at ambient pressure at 100 degree C. for 1-4 hours or at 150 degree C. under pressure for 0.5 to 4 hours thereby breaking the lignin cellulose bond and the amino compounds reacts with the lignin to form amino salt of lignin and the amino compound react with the lignin still attached to the cellulose to produce amino-lignin-cellulose. The amino salt of lignin is water soluble and form an aqueous solution of amino salt of lignin. The aqueous amino salt of lignin solution is removed from the amino-lignin-cellulose by compression, filtration or any suitable means. Water is removed from the aqueous amino salt of lignin solution until a thick solution is formed or further dried until granules are formed. The urea salt of lignin may be utilized to produce amino lignin aldehyde resins or may be reacted with epoxy compounds, furfurol or polycarboxyl acids to produce resins. The amino-lignin-cellulose has many uses such as paper production, hydrolyzed to carbohydrates, fiberboard, plywood, molded objects, fertilizer, animal feed and other uses.

The thick aqueous solution of amino salt of lignin is mixed with an aldehyde, preferable formaldehyde, and reacted thereby producing a thermoplastic or a thermosetting amino lignin aldehyde resin. The amino lignin formaldehyde resin may be modified by the addition of a basic compound with the aldehyde to produce a thermoplastic resin which may be utilized as an adhesive and cured by the acidifying and heating the reaction medium to effect polymerization thereby producing a thermosetting resin. This resin may be utilized in the production of exterior, fire resistant, hard surface, strong composite products such as particle board, plywood, fiberboard and the like, adhesives, plastics and molded products.

The amino salt of lignin and amino-lignin-cellulose mixture with most of the water evaporated off is mixed with and aldehyde such as aqueous formaldehyde then heated until the water is evaporated off then further heating the mixture to about 100-250 degree C. at ambient to elevated pressure to effect polymerization to form a hard, strong, water resistant, fire resistant, thermosetting material. A basic catalyst may be added to the amino salt of lignin and amino-lignin-cellulose mixture until the pH is about 8 then aqueous formaldehyde is added then heated until the water is evaporated to form a thermoplastic resin. An acid catalyst is added to the mixture until the pH is about 4-5 then further heated until the it solidifies to form a hard, strong, water resistant, fire resistant, thermosetting material.

The amino-lignin-cellulose produced by this invention is hydrolyzed to carbohydrates by acid hydrolysis using 70% sulfuric acid or 40% hydrochloric acid. The concentrated acid is add to the dried amino-lignin-cellulose in the ratio of 1-2 parts by weight of acid to 1 part weight of the amino-lignin-cellulose then heated to a low temperature of 50-70 degree C. for 1-6 hours to produce a mixture of carbohydrates, amino salt of the acid, lignin cellulose and cellulose. The cellulose and lignin cellulose that was not hydrolyzed is separated by pressing and filtering then retreated by reacting the lignin with an amino compound in an aqueous solution to produce a water soluble amino salt of lignin which is removed from the cellulose by pressing and filtering. The cellulose is then dried and retreated with the acid. The aqueous solution of carbohydrates and sulfuric acid are treated to separate the carbohydrates from the sulfuric acid by via ion exchange and then the sulfuric acid is re-concentrated via multiple effect evaporators. When hydrochloric acid is utilized the remaining solid cellulose and lignin cellulose are removed from the aqueous solution of carbohydrates and amino chloride by pressing and filtering then retreated. The carbohydrates and amino chloride is recovered by evaporating the aqueous hydrochloric acid under vacuum to depress the boiling point. The acid left in the carbohydrate and amino chloride is naturalized with calcium hydroxide. The carbohydrate may be converted into alcohol by yeast or any other suitable means.

A dilute acid hydrolysis process using sulfuric or hydrochloric acid may be utilized to hydrolyze the amino-lignin-cellulose into carbohydrates. The amino-lignin-cellulose is soaked in 30-40% sulfuric or hydrochloric acid for 1-4 hours then water is evaporated until the acid is more concentrated up to 40 to 70% then further reacted for 1-4 hours. The carbohydrates, acid and amino salt is filter by pressing or filtering and the cellulose and lignin cellulose residue is retreated.

This amino-lignin-aldehyde and amino-lignin-cellulose thermosetting material has many uses such as making a composite products, such as particle board, plywood, fiber boards, and the like for exterior and interior use and molded articles. The materials produced by this invention has many uses. The amino salt of lignin and amino-lignin-cellulose may be used as fertilizer, as animal feed, as an adhesive and used in the production of paper, resins and plastics. The amino-lignin-cellulose may also be hydrolyzed into carbohydrates to be used in the production of food, alcohols and other products.

The following examples illustrate the invention. Unless otherwise designated, all constituents are designated on the basis of parts by weight.

Example 1

40 parts by weight of soft wood sawdust and 15 parts by weight of urea was added to 150 parts by weight of water then the mixture was heated to the boiling point of water at ambient pressure for 1 hour. The water had a brown color after 5 minutes of heating. The remaining aqueous urea salt of lignin solution was pressed and filtered from the urea-lignin-cellulose then the urea-lignin-cellulose was washed with water pressed and filtered to remove more aqueous urea salt of lignin. The urea-lignin-cellulose is dried, weighed and has lost 25% of the softwood's original weight.

The dark brown aqueous solution of the urea salt of lignin is evaporated by heating to a thick solution or is further dried to granules. An aqueous solution of formaldehyde is added in the ratio 2 moles of formaldehyde to 1 mol of the urea, and mixed with the urea salt of lignin then a basic catalyst, sodium carbonate is added until the pH is 8.5, then heated to evaporate off the excess water to form a concentrated urea salt of lignin formaldehyde thermoplastic resin.

Example 2

20 parts by weight of guanidine was added to 80 parts by weight of fir sawdust then 250 parts by weight of water was added, mixed, after 12 hours, the dark brown guanidine salt of lignin aqueous solution was removed by pressing and filter from the guanidine-lignin-cellulose. The guanidine-lignin-cellulose was dried and weighed. There was a 15% weight loss from the fir sawdust.

Example 3

30 parts by weight of urea and 70 parts by weight of fir sawdust was mixed in 300 parts by weight of water then boiled for 1 hour. The dark brown aqueous solution of urea salt of lignin was filtered and pressed from the urea-lignin-cellulose. The urea-lignin-cellulose was washed then pressed and filtered to remove more of the urea salt of lignin. The urea-lignin-cellulose was dried for further use and weighed 70% of the original fir sawdust. The aqueous solution of urea salt of lignin was heated to evaporate the water until the aqueous urea salt of lignin became a thick paste then 50 parts by weight of fir sawdust and formaldehyde in the ratio of 3 moles of formaldehyde for each mol of urea was mixed. The mixture was heated while agitating until most of the water was removed then the mixture was pressed into a solid mass and heated to 125 degree C. for a few minutes to effect polymerization and producing a hard, strong, water resistant, fire resistant, brown colored fiberboard. Pieces of the fiberboard was boiled in water for 1 hour and there was no noticeable deterioration then the fiberboard was left in water for 2 week and there was no noticeable deterioration of the fiberboard, no loss of strength and no discoloration of the water. The fiberboard is not soluble in the common solvent such as acetone, methyl alcohol, isopropyl alcohol, acetic acid or ethanolamine.

Example 4

About 50 parts by weight of mixed soft wood and 30 parts by weight of urea is added to 150 parts by weight of water, mixed, then heated while agitating for about 1 hour. The aqueous solution of urea salt of lignin and the solid urea-lignin-cellulose are heated to remove most of the water then about 2 moles of aldehyde is add for each mol of urea, then 20 parts by weight of fir sawdust is added and mixed. The pH of the mixture is 5. The mixture is heated to remove most of the water then the mixture is pressed in to a panel and heated to 150 degree C. for a few minutes to effect polymerization and produces a hard, strong, weather resistant, fire resistant, brown colored fiberboard.

Example 5

Example 4 is modified wherein the aqueous urea salt of lignin formaldehyde and urea-lignin-cellulose-formaldehyde with most of the water removed is spread into about a 0.25" layer between two ⅛" thick fir panels then compressed and heated to about 150 degree C. for a few minutes to effect polymerization and produce a strong, weather resistant panel is produced.

Example 6

30 parts by weight of urea is mixed with 70 parts by weight of pine sawdust then added to 200 parts by weight of water. The mixture was heated under pressure to about 125 degree C. for about 1 hour thereby producing a mixture of urea salt of lignin and urea-lignin-cellulose. The aqueous solution was removed from the urea-lignin-cellulose by pressing and filtering. About 1.5 mol of formaldehyde for each mol of urea was added to the solution of urea salt of lignin, the pH was adjusted to pH 8 by the addition of sodium carbonate. Most of the water in the solution was removed by heating until a thick paste of urea salt of lignin formaldehyde resin was produced. This resin is thermoplastic.

Example 7

Example 6 is modified wherein 10 parts by weight of an amino compound selected from the list below is added to the mixture of urea salt of lignin and urea-lignin-cellulose before the formaldehyde is added.

| | |
|---|---|
| A) melamine | B) dicyandiamide |
| C) guanidine | D) biuret |
| E) cyanuric acid | F) cyamelide |
| G) melamine cyanurate | H) urea melamine condensate |
| I) Urea guanidine | J) guanidine carbonate |
| K) cyanoguanidine | L) aminoguanidine |
| M) dimelamine phosphate | N) diurea phosphate |

Example 8

10 parts by weight of urea and 30 parts by weight of biomass containing lignin containing plants listed below is ground and mixed with 100 parts by weight of water then heated in an autoclave at 150 degrees C. under 100 psig of pressure for 30 minutes. The mixture was cooled, then the mixture was pressed and filtered to remove the water soluble urea salt of lignin from the solid urea-lignin-cellulose. The solid material was re-washed several time to remove more urea salt of lignin. The urea-lignin-cellulose was dried. The aqueous solution of urea salt of lignin was heated to remove water to form a thick paste. Aqueous formaldehyde, in the amount of 2 moles for each mol of urea, was added to the thick paste then heated to evaporate most of the water thereby producing a thick paste. The thick paste was heated to about 150 degrees C. for a few minutes until polymerization took place thereby producing a dark brown, hard, strong, water insolvable, fire resistant thermoplastic resin.

| | |
|---|---|
| A) fir sawdust | B) aspen sawdust |
| C) aspen thin chips | D) Pine sawdust |
| E) sycamore sawdust | F) popular thin chips |
| G) *oleander* granules | H) *eucalyptus* sawdust |
| I) caster bean stake grindings | J) cotton stalk grindings |
| K) corn stalks grindings | L) switch grass choppings |
| M) bagasse grindings | N) grass clippings |
| O) peat grindings | P) humus particles |
| Q) cardboard particles | R) bagasse wallboard particles |
| S) grape vines particles | T) rice straw grindings |
| U) wheat straw grinding | V) buck wheat straw grindings |
| W) sorghum stalks grindings | X) soybean stalk grindings |

Example 9

Example 8 is modified wherein the urea-lignin-cellulose produced by the method of example 8 is added to 75% sulfuric acid in the ratio of 2.5 parts by weight of acid to 2 parts by weight of the urea-lignin-cellulose and heated to about 50 degree C. for 2-3 hours then add water to dilute the acid to a concentration of 25% and heat at 100 degrees C. for an hour. The carbohydrates, urea sulfate, lignin cellulose and cellulose from the reactor is pressed and filtered to recover the carbohydrate and acid. The acid and carbohydrates are separated by ionic exchange. The acid is re-concentrated via multiple effect evaporators. The remaining cellulose and lignin cellulose is retreated again with the sulfuric acid.

Example 10

Example 8 is modified wherein the urea-lignin-cellulose produced by the method of example 8 is added to 40% HCl in water in the ratio of 3 parts by weight of the acid to 2 parts by weight of the urea-lignin-cellulose then heated to about 60 degree C. for 3 hours. The hydrochloric acid is separated from the carbohydrates and remaining lignin cellulose and cellulose, urea salt of hydrochloric acid and lignin via vacuum distillation. The remaining cellulose and lignin is heated with aqueous urea to produce urea salt of lignin then filtered from the cellulose. The cellulose and lignin cellulose are retreated again with hydrochloric acid. The remaining HCl in the carbohydrate solution is naturalized with calcium hydroxide.

Example 11

Cardboard was cut into small pieces then wash with water and pressed to remove excess water. 20 parts by weight of cardboard and 10 parts by weight of urea was added to 70 parts by weight of water then heated to the boiling point of water for two hour. The non water soluble amino-lignin-cellulose was pressed and filtered to remove the dark water soluble amino salt of lignin. The amino salt of lignin was dried and weighed 8 parts by weight and the dried solids, amino-lignin-cellulose weighed 21 parts by weight.

The amino-lignin-cellulose particles were dried then added to 70% sulfuric acid then heated to 60 degree C. while agitating for 3 hours. The sulfuric acid is diluted to 35% acid and soaked for 2 hours. The emulsion containing cellulose, lignin cellulose, carbohydrates and urea sulfate was pressed and filtered to remove the carbohydrates and urea sulfate. The cellulose and lignin cellulose that was not hydrolyzed is dried then re-treated with the sulfuric acid. The carbohydrate and urea sulfate is separated from the sulfuric acid via ion exchange. The sulfuric acid is re-concentrated via multiple affect evaporators for reuse.

Example 12

Example 11 is modified wherein the aqueous mixture of urea salt of lignin and amino-lignin-cellulose is added to aqueous formaldehyde in the ratio of 2 moles of formaldehyde to 1 mol of urea then heated at about 50 degree C. for 2 hours. The heating as continued at about 100 degree C. to evaporate off the water until a thick paste was obtained then the mixture was pressed into mold and heated at 150 degree C. until polymerization was obtained thereby producing a brown, hard, strong, fire resistant, water resistant thermoplastic plastic.

Example 13

Example 2 is modified wherein another amino compound is used in place of guanide and selected from the list below:

| a) guanidine carbonate | b) aminoguandine |
| c) cyanoguanidine | d) urea guanidine condensate |
| e) urea aminoguanidine condensate | f) urea cyanoguanidine condensate |
| g) urea dicyandiamide condensate | h) diureaphosphate with free —NH$_2$ |

Example 14

Example 2 is modified wherein the aqueous solution of guanidine salt of lignin is heated to evaporate the water until a thick paste is produced then 2 moles of aqueous formaldehyde for each mol of guanidine is added and mixed then heated to evaporate most of the water then further heated up to 125 degree C. until polymerization was obtained thereby producing a thermoplastic guanidine-lignin-formaldehyde resin.

Example 15

50 parts by weight popular sawdust, 40 parts by weight of urea-guanidine condensate and 300 parts by weight of water are mixed then heated at about 100 degree C. for 2 hours while agitating. The aqueous solution of urea-guanidine salt of lignin is filtered of from the urea-guanidine-lignin-cellulose. The urea-guanidine-lignin-cellulose is washed with water to remove more urea-guanidine salt of lignin and then filtered. The urea-guanidine salt of lignin is concentrated by boiling off most of the water then reacted with paraformaldehyde in the ratio of 3 moles of paraformaldehyde to 1 mol of urea-guanidine by heating to produce polymerization of the urea-guanidine salt of lignin-paraformaldehyde.

The urea-guanidine-lignin-cellulose is washed with 15% sulfuric acid to remove more lignin and urea-guanidine-lignin and then the aqueous lignin and urea-guanidine salt of sulfuric acid is filter off of the lignin-cellulose and cellulose and reused and the lignin-cellulose and cellulose are dried. Then 40 parts by weight of 70% sulfuric acid is added to 30 parts by weight of the lignin-cellulose and cellulose and heated to 50 degree C. for 6 hours. The acid soluble carbohydrates are recovered by pressing and filtering from the unreacted lignin-cellulose and cellulose which is recycled. The carbohydrates are separated from the sulfuric acid by ion exchange and neutralized by calcium carbonate. The sulfuric acid is re-concentrated via multiple effect evaporation and re-used.

I claim:

1. A method to remove lignin from biomass which comprises lignin containing plant material and to produce amino salt of lignin, amino-lignin-cellulose, amino lignin aldehyde resin, and carbohydrates comprising mixing, heating and reacting at ambient to elevated temperature, at ambient, or elevated or reduced pressure the following components:
   a) biomass, comprising lignin containing plant material, in the amount of 200 to 400 parts by weight;
   b) amino compound, selected from the group consisting of urea, guanidine, aminoguanidine, guanidine carbonate, urea guanidine condensates, urea polyamine condensates, urea-melamine condensates, urea-cyandiamide, urea-aminoguanidine condensate, urea cyanoguanidine condensate, and mixtures thereof, and urea combined with 50% by weight of thiourea, methyl urea, biuret, cyanuric acid, melamine dicyandiamide, melamine cyanurate and mixtures thereof, said amino compounds are utilized in the amount of 25-100 parts by weight;
   c) water, 1 to 500 parts by weight;
   components a, b and c are mixed, heated at ambient to elevated pressure for 1-24 hours and reacted to produce a mixture of water soluble aqueous amino salt of lignin and water soluble cellulose and non-water soluble amino-lignin-cellulose which are separated by pressing and filtering, then the following component d, e and f are added to the aqueous amino salt of lignin;
   d) aldehyde, in the amount of 1 to 3 moles of aldehyde to 1 mol of amino compound;
   e) catalyst, selected from the group consisting of sulfuric acid, hydrogen chloride, nitric acid, halogen acids, acidic compounds containing sulfur, sulphonic acid halides, acidic phosphorus containing compound, carboxylic acids, polycarboxylic acids, nitric acids and mixtures thereof in the amount of 0.1 to 100 parts by weight;
   f) filler, in the amount of 1-300 parts by weight;
   component d, e and f are mixed with the aqueous amino salt of lignin and adjusting the pH to 5 then agitated and heated up to 70 degrees C. for 0.5 to 60 minutes then heated up to 150 degrees C. till polymerization takes place thereby producing a thermosetting, brown, hard, fire resistant aldehyde-amino-lignin-cellulose material, then the non-water soluble amino-lignin-cellulose is dried and mixed with 70% sulfuric acid in the ratio of 2 to 3 parts by weigh of acid to 2 part by weight of non-water soluble amino-lignin-cellulose then heated at 50 degrees C. for 2-6 hours thereby producing a carbohydrates mixture which also contains sulfuric acid, amino sulfate and residual cellulose and lignin cellulose mixture, then the carbohydrates, amino salt of sulfuric acid and sulfuric acid are separated from the residual lignin cellulose and cellulose by pressing and filtering, then the acid and carbohydrates are separated by ion exchange and the solution of carbohydrates are neutralized by adding of calcium hydroxide.

2. The method of claim 1 wherein the amino compound is urea.

3. The method of claim 1 wherein the aqueous amino salt of lignin is urea salt of lignin.

4. The method of claim 1 wherein the non-water soluble amino-lignin-cellulose is urea-lignin-cellulose.

5. The method of claim 1 wherein the aldehyde-amino-lignin-cellulose is urea-lignin-cellulose-formaldehyde resin.

6. The method of claim 1 wherein the filler is selected from the group consisting of alkali metal silicates, alkaline earth metal silicates, metal silicates, silica, metals and metal oxides, carbohydrates, sulphates, phosphates and borates, glass beads, amino compounds, wood particles, cellulose, lignin, urea formaldehyde resin, amino salts of organic phosphates, phenol aldehyde resins, amino aldehyde resins, plastics, powdered coke, graphite, graphite compounds, plant particles and mixtures thereof, in the amount of 1 to 300 parts by weight.

7. The method of claim 1 wherein the biomass which contains lignin containing plants are selected from spruce, pine, hemlock, fir, oak, cypress, redwood, cherry, elm chestnut, hickory, locust, sycamore, tulip, tulip, butternut, apple, alder, magnolia, dogwood, catalpa, boxwood, Crabwood, mahogany, greenheart, lancewood, letterwood, mora, prima vera, purple-heart, rosewood, teak, satinwood, mangrove, waffle, orange, lemon, logwood, fustic, osage orange, sappanwood, Brazilwood, barwood, camwood, sandalwood, rubber, gutta, mesquite, oleander, cypress, junipers, acanthus, pyracantha, ligustrum, lantana, bougainvillea, azalea, feijoa, ilex, fuscia, hibiscus, datura, holly, hydrangea, jasmine, eucalyptus, cottoneaster, xylosma, rhododendron, castor gean, eugenia, euonymus, fatshedera, aralia, cotton stalks, corn stalks, wheat straw, oat straw, rice straw, cane sugar bagasse, soybean stalks, peanut plants, pea vines, sugar beat waste, sorghum stalks, tobacco stalks, maize stalks, barley straw, buckwheat straw, quinoa stalks, cassava, potato plants, legume vines and stalks, vegetable inedible portion, weeds, grasses, vines, kelp, flowers, paper, baggasse wallboard, wood products, grass clippings, switch grass humus, peat, soft brown coal and mixtures thereof, in the amount of 200 to 400 parts by weight.

8. A method to produce carbohydrates from biomass which comprising a lignin containing cellulose plant by mixing, heating at ambient to 250 degrees C., ambient to elevated pressure and reacting the following components:
   a) biomass, comprising lignin containing cellulose plants, in the amount of 200 to 400 parts by weight;
   b) amino compound, selected from the group consisting of, urea, guanidine, aminoguanidine, guanidine carbonate, urea guanidine condensates, urea polyamine condensates, urea-melamine condensates, urea-cyandiamide, urea-aminoguanidine condensate, urea cyanoguanidine condensate, and mixtures thereof, and urea combined with 50% by weight of thiourea, methyl urea, biuret, cyanuric acid, melamine dicyandiamide, melamine cyanurate and mixtures thereof, amino compounds are utilized in the amount of 25-100 parts by weight;
   c) concentrated acid selected from the group consisting of sulfuric acid and hydrochloric acid;
   d) water, in the amount 1 to 500 parts by weight;
   components a, b and d are mixed and reacted by heating the mixture from ambient temperature to 250 degrees C. at ambient or elevated pressure thereby producing a water soluble amino salt of lignin and non-water soluble amino-lignin-cellulose, then the amino salt of lignin is pressed and filtered off and the amino-lignin-cellulose is dried, then the amino-lignin-cellulose is added to component c, mixed, then heated up to 50 degrees C. for 1-6 hours, thereby producing a carbohydrate mixture which also contains acid, amino salt and residual cellulose and lignin cellulose mixture, then the carbohydrates, amino salt and acid are removed from the residual cellulose and lignin-cellulose by pressing and filtering, then the residual cellulose and lignin-cellulose are retreated with the concentrated acid, the acid is separated from the carbohydrates and amino salt by ionic exchange when sulfuric acid is used or by vacuum distillation when hydrochloric acid is used.

9. A method to break the lignin cellulose bond from biomass comprised of lignin containing cellulose plants and to produce amino salt of lignin and amino-lignin-cellulose aldehyde resins comprising heating at ambient to 250 degrees C., at ambient pressure to elevated pressure, and reacting the following components:
   a) biomass, comprising lignin containing cellulose plant, in the amount of 200 to 400 parts by weight;
   b) amino compound, selected from the group consisting of urea, guanidine, aminoguanidine, guanidine carbonate, urea guanidine condensates, urea polyamine condensates, urea-melamine condensates, urea-cyandiamide, urea-aminoguanidine condensate, urea cyanoguanidine condensate, and mixtures thereof, and urea combined with 50% by weight of thiourea, methyl urea, biuret, cyanuric acid, melamine dicyandiamide, melamine cyanurate and mixtures thereof, amino compounds are utilized in the amount of 25-100 parts by weight;
   c) water, in the amount of 1 to 500 parts by weight;
   d) aldehyde, in the amount of 1 to 3 moles of aldehyde to 1 mol of amino compound;
   e) catalyst, selected from the group consisting of sulfuric acid, hydrogen chloride, nitric acid, halogen acids, acidic compounds containing sulfur, sulphonic acid halides, acidic phosphorus containing compound, carboxylic acids, polycarboxylic acids, nitric acids, alkali metal, alkaline earth metal and ammonia radicals, amines and mixtures thereof in the amount of 0.1 to 100 parts by weight;
   f) filler; selected from the group consisting of alkali metal silicates, alkaline earth metal silicates, metal silicates, silica, metals and metal oxides, carbohydrates, sulphates, phosphates and borates, glass beads, amino compounds, wood particles, cellulose, lignin, urea formaldehyde resin, amino salts of organic phosphates, phenol aldehyde resins, amino aldehyde resins, plastics, powdered coke, graphite, graphite compounds, plant particles and mixtures thereof, in the amount of 1 to 300 parts by weight;
   components a, b and c are mixed and heated from ambient to 250 degrees C., under ambient to elevated pressure for 1-24 hours thereby producing an amino salt of lignin and amino-lignin-cellulose and excess water is evaporated to form a thick paste, then components d, e and f are added to the thick paste, mixed, heated and polymerized.

10. Method of claim 9, wherein a basic catalyst is used thereby producing a thermoplastic amino-lignin-cellulose resin.

11. Method of claim 9, wherein an acidic catalyst is used thereby producing a thermosetting amino-lignin-cellulose aldehyde resin.

12. Method of claim 9 wherein the aldehyde is selected from the group consisting of formaldehyde, paraformaldehyde, acetoaldehyde, butyraldehyde, furfural, acrolein aldehyde, chloral, benzyl aldehyde and mixtures thereof in the amount of 1 to 3 moles of aldehyde to 1 mol of amino compound.

13. Method of claim 9 wherein the amino-lignin-cellulose aldehyde resin comprising a wood particle filler and has a pH 5 is pressed and heated to produce polymerization thereby producing a fiberboard.

14. Method of claim 9 wherein the amino compound is urea and the filler is wood particles.

15. Method of claim 10 wherein the amino compound is urea and the amino-lignin-cellulose-aldehyde resin is mixed with an acetic catalyst until the pH 5, then about 0.15-0.25 inch layer of the resin is applied to multiple layers of thin sheets of wood then pressed and heated to about 150 degree C. to effect polymerization of the resin thereby producing a plywood suitable for exterior use.

16. Method of claim 9 wherein the amino compound is a urea-melamine condensate.

17. Method of claim 9 wherein the amino compound is a urea and melamine.

18. Method of claim 9 wherein the aldehyde is formaldehyde.

19. Method of claim 9 wherein the aldehyde is furfural.

* * * * *